(12) United States Patent
Devauchelle et al.

(10) Patent No.: US 10,929,766 B2
(45) Date of Patent: Feb. 23, 2021

(54) GENERATION OF A BAYESIAN NETWORK BY COMBINING COMPATIBLE FUNCTIONAL DEPENDENCIES

(71) Applicant: International Business Machines Corporation, Armonk, NY (US)

(72) Inventors: Gregoire Devauchelle, Paris (FR); Olivier M. Lhomme, Cagnes-sur-Mer (FR)

(73) Assignee: International Business Machines Corporation, Armonk, NY (US)

( * ) Notice: Subject to any disclaimer, the term of this patent is extended or adjusted under 35 U.S.C. 154(b) by 248 days.

(21) Appl. No.: 14/948,679

(22) Filed: Nov. 23, 2015

(65) Prior Publication Data

US 2017/0147933 A1    May 25, 2017

(51) Int. Cl.
*G06N 7/00* (2006.01)
*G06N 20/00* (2019.01)
*G06F 16/901* (2019.01)

(52) U.S. Cl.
CPC ......... *G06N 7/005* (2013.01); *G06F 16/9024* (2019.01); *G06N 20/00* (2019.01)

(58) Field of Classification Search
CPC ... G06N 3/0436; G06N 20/00; G06Q 30/0201
See application file for complete search history.

(56) References Cited

U.S. PATENT DOCUMENTS

| 7,251,636 B2 | 7/2007 | Chickering et al. |
| 7,870,081 B2 | 1/2011 | Li et al. |
| 8,140,301 B2 | 3/2012 | Abe et al. |
| 8,140,569 B2 | 3/2012 | Hulten et al. |
| 2006/0112190 A1* | 5/2006 | Hulten .............. G06F 17/30536 709/238 |

(Continued)

FOREIGN PATENT DOCUMENTS

GB     2510422 A     8/2014

OTHER PUBLICATIONS

Taheri et al., "Structure Learning of Bayesian Networks Using a New Unrestricted Dependency Algorithm," IMMM 2012: The Second International Conference on Advances in Information Mining and Management, 2012, pp. 54-59.

*Primary Examiner* — Miranda M Huang
*Assistant Examiner* — Kevin W Figueroa
(74) *Attorney, Agent, or Firm* — Winstead PC (57) ABSTRACT

A computer implemented method, computer program product and system for generating a Bayesian network. A dataset comprising multiple instances of multiple variables is received. A target variable from the received dataset is selected. Multiple parent sets of variables for the target variable are determined, such that, for each parent set of variables, the target variable is functionally dependent on the respective parent set of variables. For multiple variables of the received dataset, the selecting of a new target variable from the received dataset and determining multiple parent sets of variables for the new target variable is repeated. A Bayesian network (includes a directed acyclic graph of nodes and edges) is then generated for the variables such that one or more of the determined parent sets of variables for the target variables are inserted into the graph and edges from the graph are removed to ensure that the graph is acyclic.

15 Claims, 7 Drawing Sheets

(56) References Cited

U.S. PATENT DOCUMENTS

| | | | | |
|---|---|---|---|---|
| 2008/0281771 | A1* | 11/2008 | Lai | G06N 7/005 706/55 |
| 2014/0082022 | A1* | 3/2014 | Lamba | G06F 17/30958 707/777 |
| 2015/0142709 | A1* | 5/2015 | Sahai | G06N 7/005 706/12 |

* cited by examiner

GENERATION OF A BAYESIAN NETWORK BY COMBINING COMPATIBLE FUNCTIONAL DEPENDENCIES

TECHNICAL FIELD

The present invention relates to a method, system and computer program product for generating a Bayesian network.

BACKGROUND

A Bayesian network is a probabilistic model that represents a set of random variables and their conditional dependencies via a directed acyclic graph (DAG). Such Bayesian networks are useful in many applications where future predictions are useful, such as healthcare.

Learning from data, the structure of a Bayesian network is an algorithmically complex task for which many different methods have been proposed. These methods all need to impose restrictions on the structures that can be learned. In particular, a component that aims at limiting the number of parents of a node is required as the number of parents determines the size of the Bayesian network and so such a component is present to limit the number of parents of each node. Indeed, the size of the Bayesian network is characterized by the size of the Cartesian product of the possible values for a node and its parents.

When the value of a variable X is exactly determined by the values taken by a set of variables S, then X is said to be functionally dependent on S. When a functional dependency exists in the data such that the size of the Cartesian product of the possible values for a node and the node's parents is behind the limits inherent to the learning method, this dependency cannot be learned. Thus, the learned Bayesian network will not perfectly fit the distribution given by the data. Such a limit placed on the methodology of constructing the Bayesian network affects the ability of the Bayesian network to accurately capture the causal relationships between variables.

BRIEF SUMMARY

In one embodiment of the present invention, a computer implemented method for generating a Bayesian network comprises receiving a dataset comprising multiple instances of multiple variables. The method further comprises selecting a target variable from the received dataset. The method additionally comprises determining multiple parent sets of variables for the target variable, such that, for each parent set of variables, the target variable is functionally dependent on the respective parent set of variables. Furthermore, the method comprises repeating, for multiple variables of the received dataset, the selecting of a new target variable from the received dataset and determining of multiple parent sets of variables for the new target variable, such that, for each parent set of variables, the new target variable is functionally dependent on the respective parent set of variables. Additionally, the method comprises generating, by a processor, the Bayesian network for the variables, the Bayesian network comprising a directed acyclic graph of nodes and edges, the generating including inserting one or more of the determined parent sets of variables for the target variables into the graph and removing edges from the graph to ensure that the graph is acyclic.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

Figure 1:
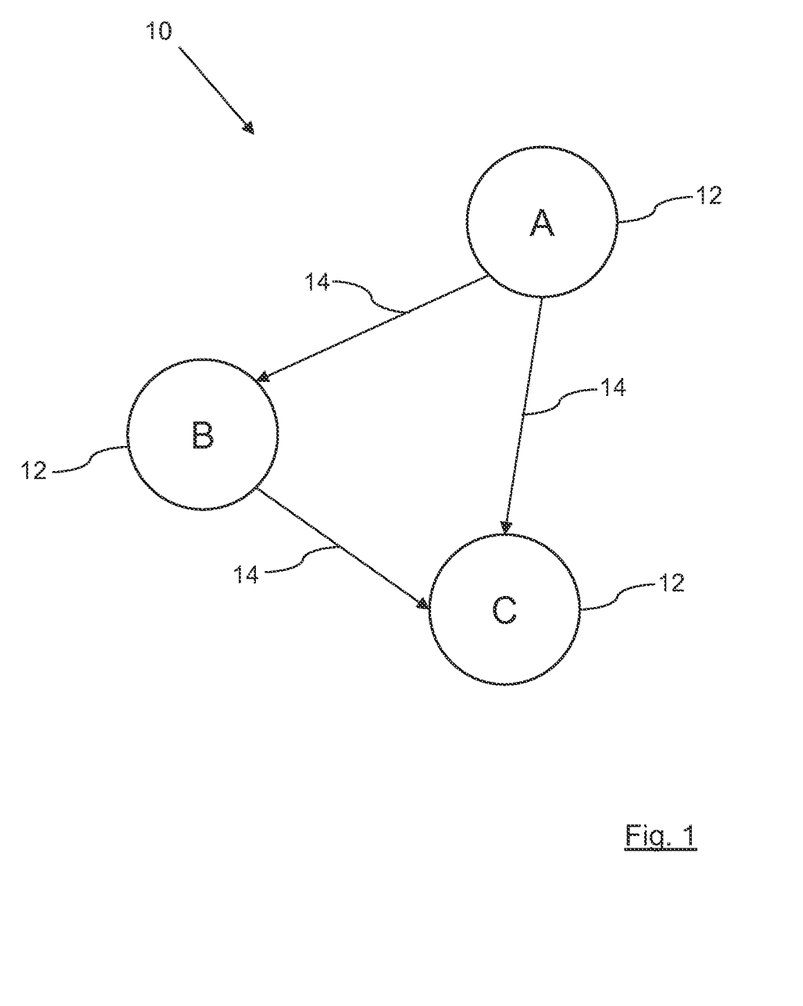
FIG. 1 is a schematic diagram of a Bayesian network in accordance with an embodiment of the present invention.

FIG. 1 shows an example of a Bayesian network 10, which is comprised of three nodes 12 and three edges 14, with each edge 14 connecting two nodes 12 together, in accordance with an embodiment of the present invention. Edges 14 are also referred to as arcs in a graph. Usually in a Bayesian network the edges 14 are directional, implying a deterministic or more usually probabilistic relationship between the two connected nodes 12. Each node 12 can be considered a variable within a wider system and many real world systems can be represented as a Bayesian network. Here a Bayesian network 10 is shown with only three nodes 12 and three edges 14 for simplicity of explanation, but it is quite common to construct a Bayesian network 10 with at least 100 nodes 12.

Learning from data, the structure of a Bayesian network is an algorithmically complex task for which many different methods have been proposed. These methods all need to impose restrictions on the structures that can be learned. In particular, a component that aims at limiting the number of parents of a node 12 is always required as the number of parents determines the size of the Bayesian network 10 and so such a component is present to limit the number of parents of each node 12. Indeed, the size of the Bayesian network 10 is characterized by the size of the Cartesian product of the possible values for a node 12 and its parents. A parent is a node 12 which has a directional edge connecting to a child node 12. In the example of FIG. 1, the node A is a parent to both nodes B and C. The node C has two parent nodes A and B. As stated above, as a practical step, the number of permissible parents for a node 12 has to be limited, in order to ensure that a workable Bayesian network 10 can be generated from the available data, in a reasonable period of time.

When the value of a variable X is exactly determined by the values taken by a set of variables S, then X is said to be functionally dependent on S. When a functional dependency exists in the data such that the size of the Cartesian product of the possible values for a node 12 and the node's parents is behind the limits inherent to the learning method, this dependency cannot be learned. Thus, the learned Bayesian network 10 will not perfectly fit the distribution given by the data. Such a limit placed on the methodology of constructing the Bayesian network 10 affects the ability of the Bayesian network 10 to accurately capture the causal relationships between variables.

Figure 2:
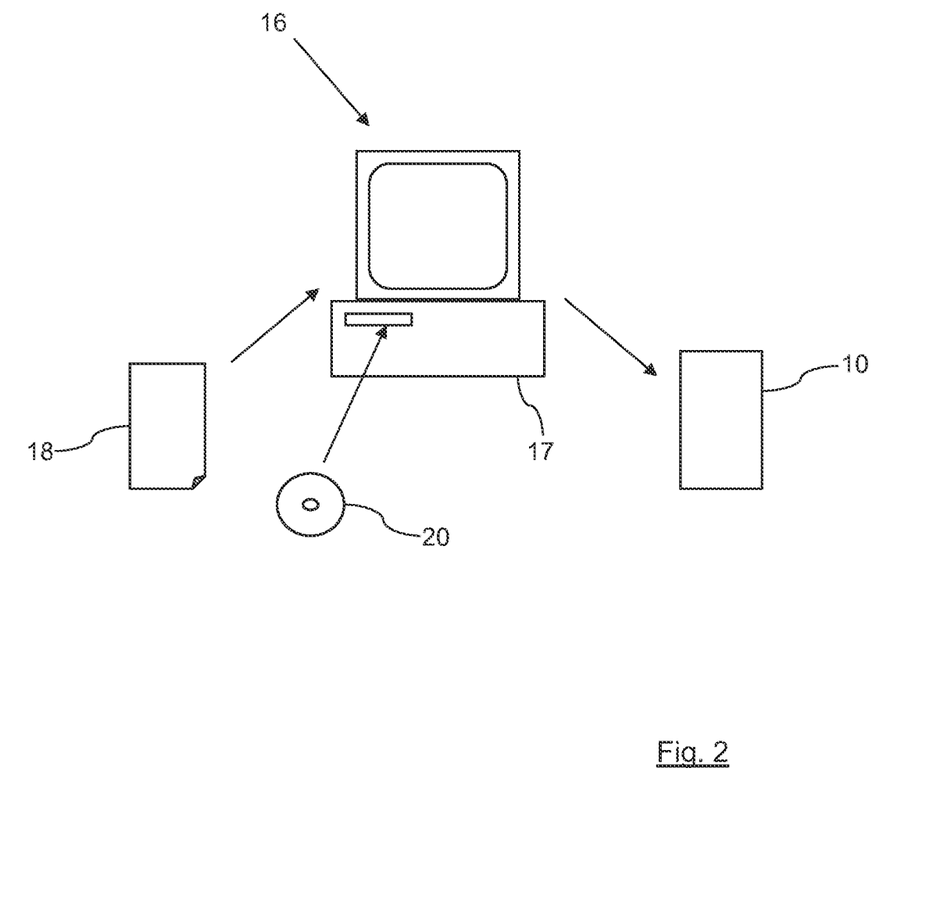
FIG. 2 is a schematic diagram of a computing system in accordance with an embodiment of the present invention.

A method and system to exploit functional dependencies between variables in order to build a more accurate Bayesian network is provided by a computing system 16, shown in FIG. 2, in accordance with an embodiment of the present invention. The computing system comprises a suitable processor 17 and the computer system 16 can operate on a dataset 18 to produce a Bayesian network 10 which better fits the data contained within the dataset 18. The dataset 18 may relate to 100 different variables, for example, and have 1 million instances, where each instance is a set of values for the variables contained within the dataset 18. The function of the computing system 16 is to generate a Bayesian network 10 for the variables defined by the data within the dataset 18.

Functional dependencies between the different variables expressed in the dataset 18 may occur for many different reasons, but the main reason is that the data defined by the variables respects some mathematical or physical law(s), and a formal model is not known or not explicitly expressed within the dataset 18. Explicitly handling these dependencies improves a learning algorithm for Bayesian networks in several ways: firstly in that the method pushes further the limits of what can be learned and secondly that the method improves the efficiency of the learning algorithm by exploiting each functional dependency explicitly in order to avoid representing the functional dependencies as general relations defined in one or more extensions to the Bayesian network, which saves time and memory consumption.

The method executed by the computing system 16 analyzes the data in the dataset 18 to find functional dependencies between the variables expressed within the dataset 18. A given variable may be determined by several alternative functional dependencies. The method collects a number of alternative functional dependencies for each variable. The set of all alternative functional dependencies that have been collected for all the variables is then used to build a Bayesian network 10, or to improve the quality of an existing Bayesian network 10. The disclosed method combines compatible functional dependencies in order to get a directed acyclic graph (DAG) which represents the structure of the Bayesian network 10. FIG. 1 shows such a DAG 10 of nodes 12 and edges 14.

Figure 3:
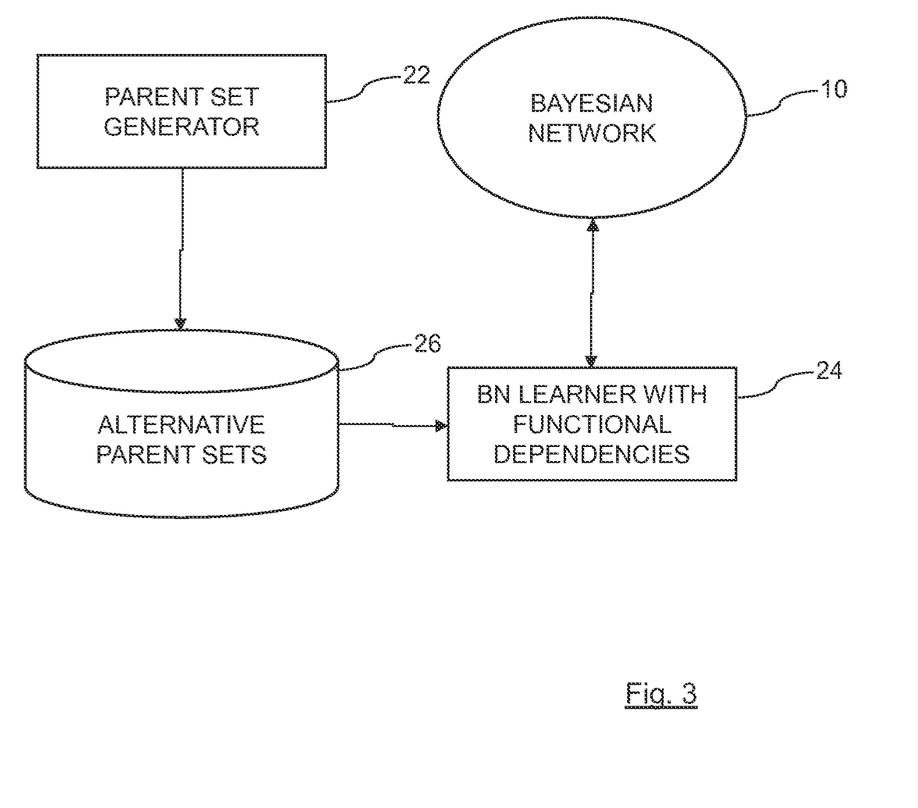
FIG. 3 is a schematic diagram of software components within the computing system in accordance with an embodiment of the present invention.

The system for exploiting functional dependencies for learning a Bayesian network 10 has two main components: a parent set generator 22, and a Bayesian network learner with functional dependencies 24, as shown in FIG. 3, in accordance with an embodiment of the present invention. These components are software components being operated by the processor 17 of the computing system 16. The computing system 16 is controlled by a computer program product provided on a computer readable medium 20 (shown in FIG. 2). The computer readable medium 20 is a CD-ROM storing a computer program that can be used to control the processor 17 of the computing system 16. The computer program comprises instructions that are executed by the processor 17 of the computing system 16.

The parent set generator 22 tries to find, for each variable of the dataset 18, several functional dependencies which have the variable in question as a target variable. The functional dependencies produced by the parent set generator 22 are all minimal, that is to say that the generator 22 cannot remove one of the parents in the functional dependency without losing the property that the target variable functionally depends on the parent set. It is also possible that some variables do not appear as target variables of any functional dependency. All of the variables within the dataset 18 are tested in this manner, with multiple parent sets being defined for each variable, if possible, each of which parent sets defines a functional dependency from the members of the parent set to the variable in question.

The Bayesian network learner with functional dependencies 24 takes the set of available functional dependencies defined by the alternative parent sets from a store 26 and tries to exploit them for building a Bayesian network 10 (in this case the initial Bayesian Network can have no edges and defines a uniform distribution for the variables) or for improving a current Bayesian network 10.

Figure 4:
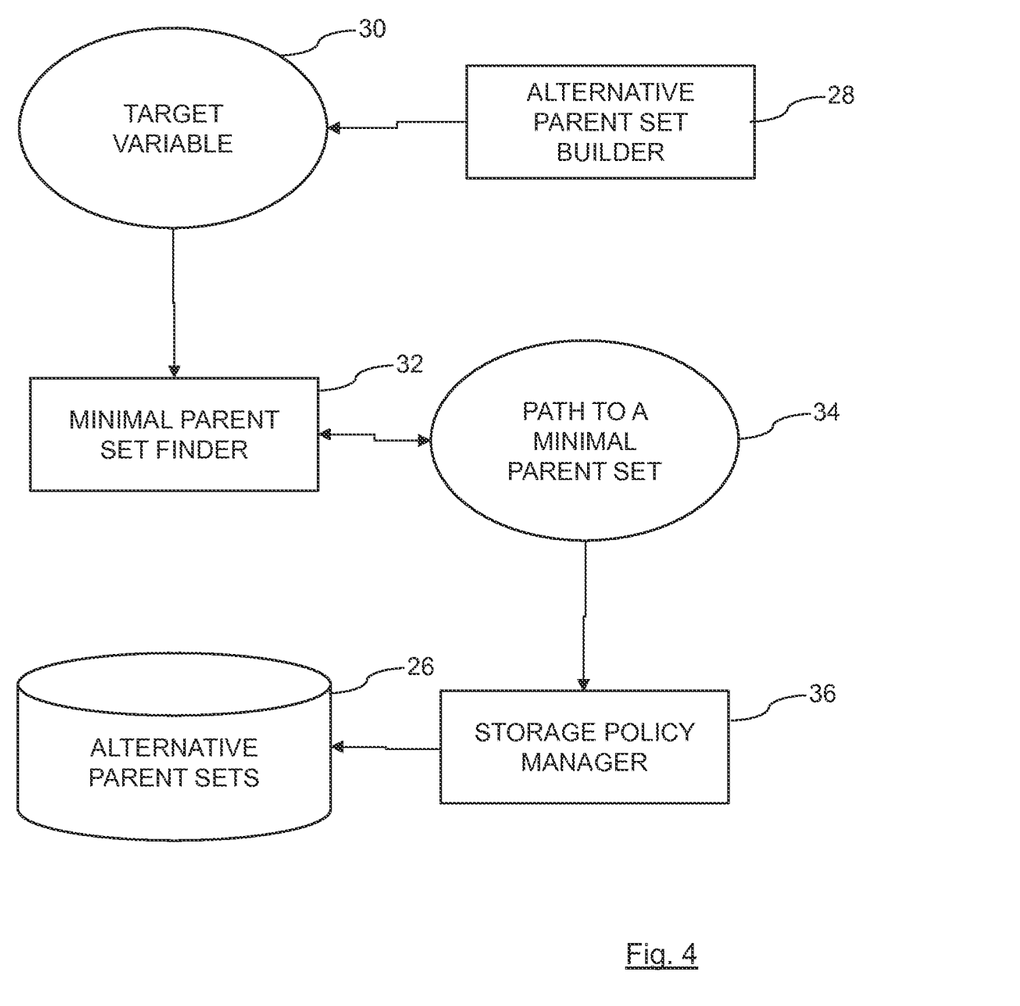
FIG. 4 is a schematic diagram of a parent set generator in accordance with an embodiment of the present invention.

FIG. 4 shows a detailed diagram of the components of the parent set generator 22 in accordance with an embodiment of the present invention. An alternative parent set builder 28 is the main component of the parent set generator 22. The alternative parent set builder 28 repeatedly chooses a target variable 30 for which the builder 28 decides to find a parent set. The builder 28 may have already found some parent sets for this target variable 30, and the goal of the builder 28 is to get additional parent sets for this target variable 30. Then the alternative parent set builder 28 calls a minimal parent set finder 32, which returns a parent set for the specific variable 30 which is minimal, that is to say that the set cannot be reduced while keeping the property that there is a functional dependency between the parent set and the target variable 30.

The minimal parent set is returned as a path 34 within a tree, instead of simply a set of variables. This allows the minimal parent set finder 32 to be re-invoked starting from this path 34, making possible an efficient implementation of the consecutive calls to the minimal parent set finder 32. The returned parent set 34 is then analyzed by a storage policy manager 36 in order to decide whether or not to keep the set 34 in a store 26 of the alternative parent sets. The path 34 comprises a set of instructions, each instruction defining whether a variable has been removed from the parent set or whether a variable is required in the parent set.

Figure 5:
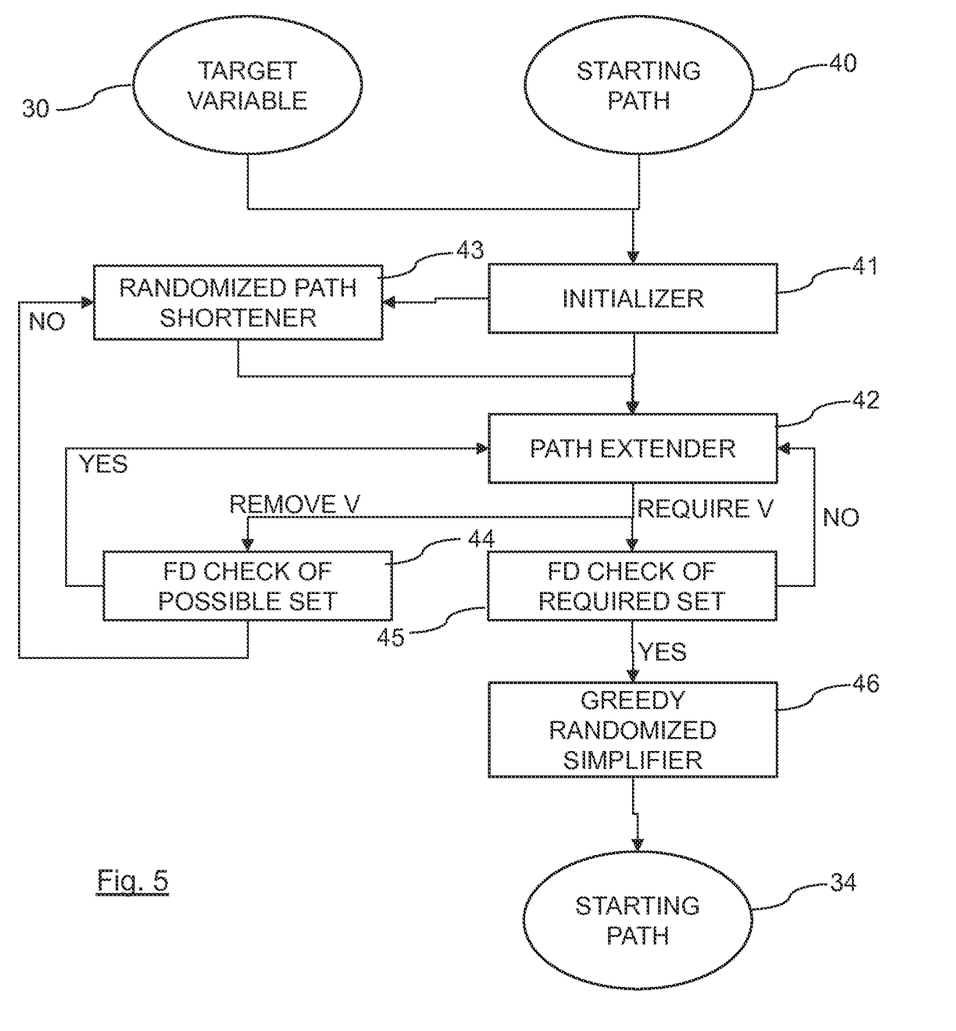
FIG. 5 is a schematic diagram of a minimal parent set finder in accordance with an embodiment of the present invention.

The minimal parent set finder 32 is detailed in FIG. 5 in accordance with an embodiment of the present invention. The minimal parent set finder 32 finds a minimal parent set of the given target variable 30. The minimal parent set finder 32 starts from an initial starting path 40, representing a set of valid parent sets in a tree search structure of the space of all the possible parent sets. A parent set is valid when the values taken by the variables in the parent set are sufficient to determine exactly the value of the target variable 30, that is, when there is a functional dependency between the parent set and the target variable 30. The starting path 40 is also possibly an empty path, which represents all the valid parent sets corresponding to all subsets of the variables except the target variable 30.

A path is an ordered list of decisions of two different forms: "remove variable V from the parent set" and "require variable V in the parent set." Once a variable V has been removed from the parent set in a given path, no path extending this path can have V in the parent set. Conversely, once a variable V has been required to be in the parent set in a given path, every path extending this path has V in the parent set. The minimal parent set finder 32 works with a current path, initially set to the starting path 40.

An initializer 41 checks that the target variable 30 has possible parents (that is that all the other variables determines the value of the target variable 30), and that the target variable 30 is not a constant. If the starting path is empty, then the current path is set to the empty path, with possible variables being all the other variables, and required variables being the empty set. Then a path extender 42 is called. If the starting path is not empty, then this comes from a previous call of the minimal parent set finder, and the process moves to a randomized path shortener 43. This unit 43 cuts the ends of the list of decisions building the path, choosing the cutting point randomly. By construction, the algorithm knows that the new path defined by a truncated list verifies the properties needed by a current path: the target variable 30 is functionally dependent on the possible set of variables in the parent set, and not functionally dependent on the required set of variables in the parent set. This current path is thus sent to the path extender 42.

The path extender 42 chooses how to extend the current path, either by removing a variable from the parent set or by requiring a variable to be present in the parent set. The path extender 42 transforms the starting path into a candidate path via a random modification of the starting path. Depending on the type of extension, a different check is performed. After an extension that modifies the possible set, the possible set is checked at unit 44 whether there is still a functional dependency with the target variable. If yes, the method reinvokes the path extender 42, otherwise, the unit 44 calls the randomized path shortener 43. After an extension that modifies the required set, the required set is checked at unit 45 whether there is now a functional dependency with the target variable. If the required set has not yet a functional dependency with the target variable, the method reinvokes the path extender 42. However, if the required set has now a functional dependency, the methods calls a greedy randomized simplifier 46, which tries to remove each variable from the required set (in a randomized order) and checks if the functional dependency still exists. When the functional dependency does still exist, the variable can be safely removed from the required set in order to produce a minimal parent set. When each variable has been checked, the remaining variables in the required set are a minimal parent set 34. The greedy randomized simplifier 46 minimises the candidate path by removing any parent variables that are not required for the functional dependency between the patent set of variables defined by the candidate path and the target variable.

Figure 6:
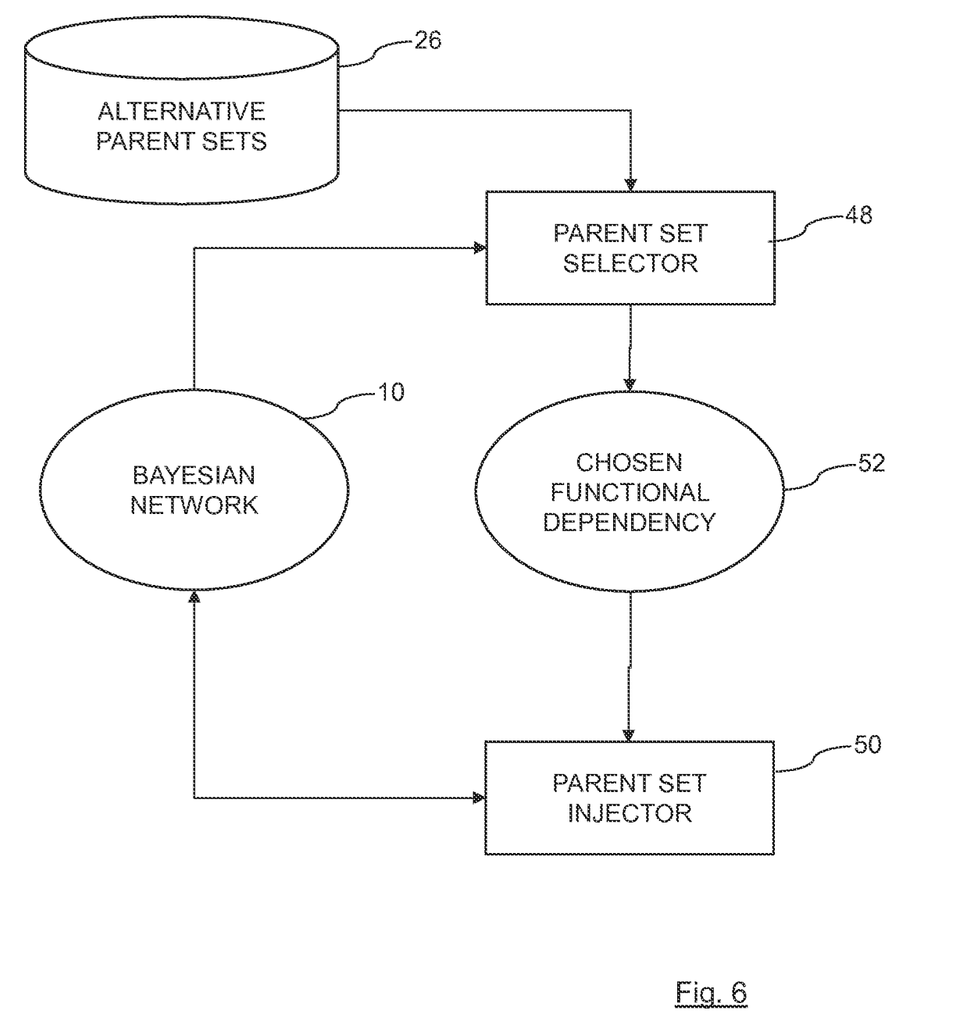
FIG. 6 is a schematic diagram of a Bayesian learner that uses functional dependencies in accordance with an embodiment of the present invention.

The Bayesian network learner with functional dependencies (unit 24 in FIG. 3) is shown in more detail in FIG. 6 in accordance with an embodiment of the present invention. Given alternative parent sets 26 that represent several possible sets of parents for each variable 30, given the data 18, and given an initial Bayesian network 10 that is possibly empty, a parent set selector 48 selects a functional dependency 52 that could improve the current Bayesian network 10. Then, a parent set injector 50 takes the chosen functional dependency 52, and adds to the Bayesian network 10 all the edges between the parents of the functional dependency 52 to the target variable 30. Then, the parent set injector 50 restores the acyclic property of the Bayesian network 10 by removing some edges of the Bayesian network 10.

Figure 7:
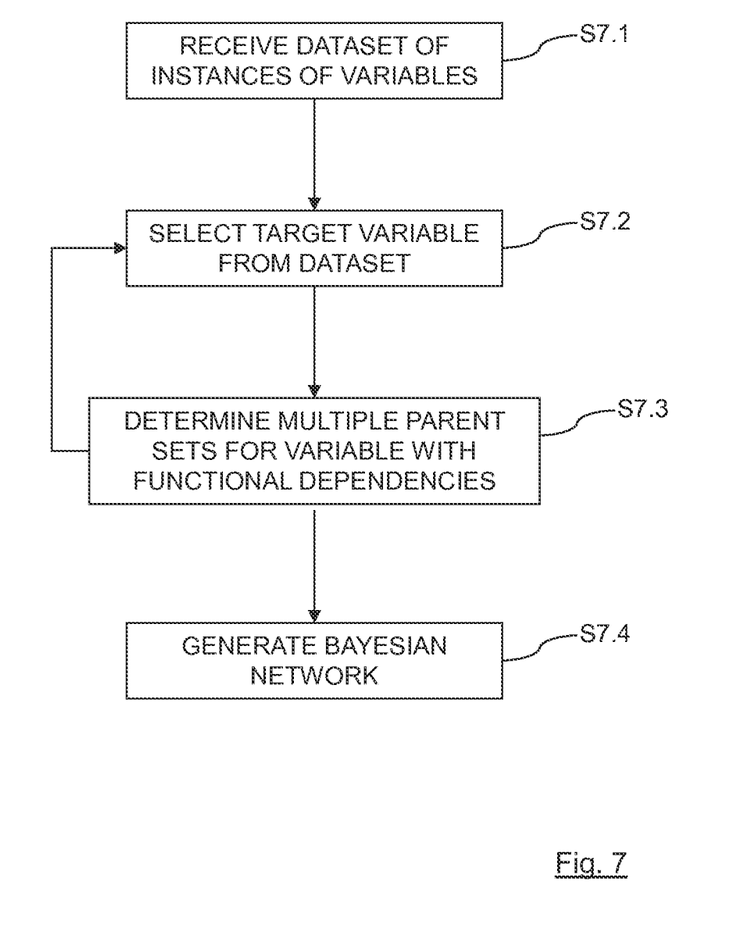
FIG. 7 is a flowchart of a method of generating a Bayesian network in accordance with an embodiment of the present invention.

FIG. 7 shows a flowchart of the working of the computing system 16 in the process of generating the Bayesian network 10 in accordance with an embodiment of the present invention. The method comprises, at step S7.1, receiving a dataset 18 comprising multiple instances of multiple variables 30. Each instance defines a set of values for the variables 30 that form the dataset 18 that is being worked on by the processor 17 of the computing system. Variables can carry numerical values (1-100 for example), text ranges (low, medium, high) or binary Boolean values (true or false), depending upon the nature of the thing that is being captured by the variable. For example in a healthcare scenario creating a Bayesian network that relates to the risk of cancer, a variable may represent an exposure to pollution that could be represented as low, medium and high.

The next stage of the method is step S7.2, this step comprises selecting a target variable 30 from the received dataset 18. This is followed by step S7.3, which comprises determining multiple parent sets of variables for the target variable 30, such that, for each parent set of variables, the target variable 30 is functionally dependent on the respective parent set of variables. Steps S7.2 and S7.3 are then repeated, for multiple variables 30 of the received dataset 18, with the selecting of a new target variable 30 from the received dataset 18 and the determining of multiple parent sets of variables for the new target variable 30, such that, for each parent set of variables, the new target variable 30 is functionally dependent on the respective parent set of variables carried out for all of the variables 20 for which functional dependencies can be generated.

The final step in the method is step S7.4, which comprises generating a Bayesian network 10 for the variables 30, the Bayesian network 10 comprising a directed acyclic graph of nodes and edges, the generating including inserting one or more of the determined parent sets of variables for the target variables 30 into the graph and removing edges from the graph to ensure that the graph is acyclic. The various functional dependencies that have been determined from the dataset 18 are inserted into the Bayesian network 10, while measures are taken to ensure that the insertions do not lead to cycles within the network 10. Any cycles are broken by the removal of edges within the network 10, to ensure that the final Bayesian network 10 is acyclic.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer implemented method for generating a Bayesian network, the method comprising:
   receiving a dataset comprising multiple instances of multiple variables, wherein each instance defines a set of values for the variables that form the dataset, wherein the variables carry numerical values, text ranges or binary Boolean values relating to a real world scenario;
   selecting a target variable from the received dataset;
   determining multiple parent sets of variables for the target variable, such that, for each parent set of variables, the target variable has a functional dependency on the respective parent set of variables;
   repeating for multiple variables of the received dataset, the selecting of a new target variable from the received dataset and determining of multiple parent sets of variables for the new target variable, such that, for each parent set of variables, the new target variable has a functional dependency on the respective parent set of variables;

removing each variable from the determined multiple parent sets of variables in a randomized order to determine if a functional dependency still exists when the variable is removed from the determined multiple parent sets of variables;

permanently removing the variable from the determined multiple parent sets of variables in response to the functional dependency still existing when the variable is removed from the determined multiple parent sets of variables thereby producing a minimal parent set of variables;

returning the determined multiple parent sets of variables for the target variable and for the new target variable as a path within a tree, wherein the path comprises a set of instructions, wherein each of the set of instructions defines whether a variable has been removed from a parent set or whether a variable is required in the parent set;

analyzing the returned parent sets of variables for the target variable and for the new target variable in order to determine whether or not to keep the determined multiple parent sets of variables for the target variable and for the new target variable in a data store, wherein the determined multiple parent sets of variables for the target variable and for the new target variable are kept in response to there being a functional dependency between the parent set for the target variable and the target variable and in response to there being a functional dependency between the parent set for the new target variable and the new target variable;

storing the determined multiple parent sets of variables for the target variable and for the new target value in the data store in response to determining to keep the determined multiple parent sets of variables for the target variable and for the new target value in the data store; and saving time and memory consumption and improving the efficiency of a learning algorithm for Bayesian networks by generating the Bayesian network representing a real world system for the variables by inserting one or more of the stored determined parent sets of variables for the target variables into the graph and removing edges from the graph to ensure that the graph is acyclic and by exploiting each functional dependency between the parent set for the target variable and the target variable and between the parent set for the new target variable and the new target variable in order to avoid representing functional dependencies as general relations defined in one or more extensions to the Bayesian network, wherein the Bayesian network comprises a directed acyclic graph of nodes and edges.

2. The method as recited in claim 1, wherein the repeating, for multiple variables of the received dataset, the selecting of the new target variable from the received dataset and determining of multiple parent sets of variables for the new target variable, such that, for each parent set of variables, the new target variable is functionally dependent on the respective parent set of variables, comprises repeating the selecting of the new target variable and determining of multiple parent sets of variables for the new target variable for all variables within the dataset for which such parent sets of variables can be generated.

3. The method as recited in claim 1 further comprising:
receiving a selection of a functional dependency that improves the Bayesian network;
adding to the Bayesian network all edges between parents of the functional dependency to the target variable; and
restoring the acyclic property of the Bayesian network by removing one or more edges of the Bayesian network.

4. The method as recited in claim 1, wherein the determining of multiple parent sets of variables for the target variable, such that, for each parent set of variables, the target variable is functionally dependent on the respective parent set of variables, further comprises defining a starting path for the parent set of variables, transforming the starting path into a candidate path via a random modification of the path and checking the candidate path for a functional dependency between the parent set of variables defined by the candidate path and the target variable.

5. The method as recited in claim 4, wherein the determining of multiple parent sets of variables for the target variable, such that, for each parent set of variables, the target variable is functionally dependent on the respective parent set of variables, further comprises minimizing the candidate path by removing any parent variables that are not required for the functional dependency between the parent set of variables defined by the candidate path and the target variable.

6. A computer program product for generating a Bayesian network, the computer program product comprising a computer readable storage medium having program code embodied therewith, the program code comprising the programming instructions for:

receiving a dataset comprising multiple instances of multiple variables, wherein each instance defines a set of values for the variables that form the dataset, wherein the variables carry numerical values, text ranges or binary Boolean values relating to a real world scenario;

selecting a target variable from the received dataset;

determining multiple parent sets of variables for the target variable, such that, for each parent set of variables, the target variable has a functional dependency on the respective parent set of variables;

repeating for multiple variables of the received dataset, the selecting of a new target variable from the received dataset and determining of multiple parent sets of variables for the new target variable, such that, for each parent set of variables, the new target variable has a functional dependency on the respective parent set of variables;

removing each variable from the determined multiple parent sets of variables in a randomized order to determine if a functional dependency still exists when the variable is removed from the determined multiple parent sets of variables;

permanently removing the variable from the determined multiple parent sets of variables in response to the functional dependency still existing when the variable is removed from the determined multiple parent sets of variables thereby producing a minimal parent set of variables;

returning the determined multiple parent sets of variables for the target variable and for the new target variable as a path within a tree, wherein the path comprises a set of instructions, wherein each of the set of instructions defines whether a variable has been removed from a parent set or whether a variable is required in the parent set;

analyzing the returned parent sets of variables for the target variable and for the new target variable in order to determine whether or not to keep the determined multiple parent sets of variables for the target variable and for the new target variable in a data store, wherein the determined multiple parent sets of variables for the target variable and for the new target variable are kept in response to there being a functional dependency between the parent set for the target variable and the target variable and in response to there being a functional dependency between the parent set for the new target variable and the new target variable;

storing the determined multiple parent sets of variables for the target variable and for the new target value in the data store in response to determining to keep the determined multiple parent sets of variables for the target variable and for the new target value in the data store; and saving time and memory consumption and improving the efficiency of a learning algorithm for Bayesian networks by generating the Bayesian network representing a real world system for the variables by inserting one or more of the stored determined parent sets of variables for the target variables into the graph and removing edges from the graph to ensure that the graph is acyclic and by exploiting each functional dependency between the parent set for the target variable and the target variable and between the parent set for the new target variable and the new target variable in order to avoid representing functional dependencies as general relations defined in one or more extensions to the Bayesian network, wherein the Bayesian network comprises a directed acyclic graph of nodes and edges.

7. The computer program product as recited in claim 6, wherein the programming instructions for repeating, for multiple variables of the received dataset, the selecting of the new target variable from the received dataset and determining of multiple parent sets of variables for the new target variable, such that, for each parent set of variables, the new target variable is functionally dependent on the respective parent set of variables, comprises programming instructions for repeating the selecting of the new target variable and determining of multiple parent sets of variables for the new target variable for all variables within the dataset for which such parent sets of variables can be generated.

8. The computer program product as recited in claim 6, wherein the program code further comprises the programming instructions for:
receiving a selection of a functional dependency that improves the Bayesian network;
adding to the Bayesian network all edges between parents of the functional dependency to the target variable; and
restoring the acyclic property of the Bayesian network by removing one or more edges of the Bayesian network.

9. The computer program product as recited in claim 6, wherein the programming instructions for determining of multiple parent sets of variables for the target variable, such that, for each parent set of variables, the target variable is functionally dependent on the respective parent set of variables, further comprises programming instructions for defining a starting path for the parent set of variables, transforming the starting path into a candidate path via a random modification of the path and checking the candidate path for a functional dependency between the parent set of variables defined by the candidate path and the target variable.

10. The computer program product as recited in claim 9, wherein the programming instructions for determining of multiple parent sets of variables for the target variable, such that, for each parent set of variables, the target variable is functionally dependent on the respective parent set of variables, further comprises programming instructions for minimizing the candidate path by removing any parent variables that are not required for the functional dependency between the parent set of variables defined by the candidate path and the target variable.

11. A system, comprising:
a memory unit for storing a computer program for generating a Bayesian network; and
a processor coupled to the memory unit, wherein the processor is configured to execute the program instructions of the computer program comprising:
receiving a dataset comprising multiple instances of multiple variables, wherein each instance defines a set of values for the variables that form the dataset, wherein the variables carry numerical values, text ranges or binary Boolean values relating to a real world scenario;
selecting a target variable from the received dataset;
determining multiple parent sets of variables for the target variable, such that, for each parent set of variables, the target variable has a functional dependency on the respective parent set of variables;
repeating for multiple variables of the received dataset, the selecting of a new target variable from the received dataset and determining of multiple parent sets of variables for the new target variable, such that, for each parent set of variables, the new target variable has a functional dependency on the respective parent set of variables;
removing each variable from the determined multiple parent sets of variables in a randomized order to determine if a functional dependency still exists when the variable is removed from the determined multiple parent sets of variables;
permanently removing the variable from the determined multiple parent sets of variables in response to the functional dependency still existing when the variable is removed from the determined multiple parent sets of variables thereby producing a minimal parent set of variables;
returning the determined multiple parent sets of variables for the target variable and for the new target variable as a path within a tree, wherein the path comprises a set of instructions, wherein each of the set of instructions defines whether a variable has been removed from a parent set or whether a variable is required in the parent set;
analyzing the returned parent sets of variables for the target variable and for the new target variable in order to determine whether or not to keep the determined multiple parent sets of variables for the target variable and for the new target variable in a data store, wherein the determined multiple parent sets of variables for the target variable and for the new target variable are kept in response to there being a functional dependency between the parent set for the target variable and the target variable and in response to there being a functional dependency between the parent set for the new target variable and the new target variable;
storing the determined multiple parent sets of variables for the target variable and for the new target value in the data store in response to determining to keep the determined multiple parent sets of variables for the target variable and for the new target value in the data store; and saving time and memory consumption and improving the efficiency of a learning algorithm for Bayesian networks by generating the Bayesian network representing a real world system for the variables by inserting one or more of the stored determined parent sets of variables for the target variables into the graph and removing edges from the graph to ensure that the graph is acyclic and by exploiting each functional dependency between the parent set for the target variable and the target variable and between the parent set for the new target variable and the new target variable explicitly in order to avoid representing functional dependencies as general relations defined in one or more extensions to the Bayesian network, wherein the Bayesian network comprises a directed acyclic graph of nodes and edges.

12. The system as recited in claim 11, wherein the program instructions for repeating, for multiple variables of the received dataset, the selecting of the new target variable from the received dataset and determining of multiple parent sets of variables for the new target variable, such that, for each parent set of variables, the new target variable is functionally dependent on the respective parent set of variables, comprises program instructions for repeating the selecting of the new target variable and determining of multiple parent sets of variables for the new target variable for all variables within the dataset for which such parent sets of variables can be generated.

13. The system as recited in claim 11, wherein the program instructions of the computer program further comprise:
receiving a selection of a functional dependency that improves the Bayesian network;
adding to the Bayesian network all edges between parents of the functional dependency to the target variable; and
restoring the acyclic property of the Bayesian network by removing one or more edges of the Bayesian network.

14. The system as recited in claim 11, wherein the program instructions for determining of multiple parent sets of variables for the target variable, such that, for each parent set of variables, the target variable is functionally dependent on the respective parent set of variables, further comprises program instructions for defining a starting path for the parent set of variables, transforming the starting path into a candidate path via a random modification of the path and checking the candidate path for a functional dependency between the parent set of variables defined by the candidate path and the target variable.

15. The system as recited in claim 14, wherein the program instructions for determining of multiple parent sets of variables for the target variable, such that, for each parent set of variables, the target variable is functionally dependent on the respective parent set of variables, further comprises program instructions for minimizing the candidate path by removing any parent variables that are not required for the functional dependency between the parent set of variables defined by the candidate path and the target variable.

* * * * *